US009720820B2

(12) United States Patent
Chu et al.

(10) Patent No.: US 9,720,820 B2
(45) Date of Patent: Aug. 1, 2017

(54) DATA STORAGE DEVICE AND FLASH MEMORY CONTROL METHOD

(71) Applicant: Silicon Motion, Inc., Jhubei, Hsinchu County (TW)

(72) Inventors: Po-Chia Chu, Kaohsiung (TW); Yen-Hung Lin, New Taipei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 140 days.

(21) Appl. No.: 14/255,165

(22) Filed: Apr. 17, 2014

(65) Prior Publication Data

US 2015/0067239 A1    Mar. 5, 2015

(30) Foreign Application Priority Data

Aug. 30, 2013  (TW) .............................. 102131199 A

(51) Int. Cl.
*G06F 12/00* (2006.01)
*G06F 12/02* (2006.01)
(52) U.S. Cl.
CPC .. *G06F 12/0246* (2013.01); *G06F 2212/7211* (2013.01)
(58) Field of Classification Search
CPC .................................................. G06F 12/0246
See application file for complete search history.

(56) References Cited

U.S. PATENT DOCUMENTS

| 8,275,928 B2 | 9/2012 | Lin | |
|---|---|---|---|
| 8,316,176 B1* | 11/2012 | Phan | G06F 12/0246 365/185.33 |
| 8,402,242 B2 | 3/2013 | Hu et al. | |
| 2010/0017650 A1 | 1/2010 | Chin et al. | |
| 2010/0077132 A1* | 3/2010 | Hung | G06F 11/1068 711/103 |
| 2011/0029715 A1* | 2/2011 | Hu | G06F 12/0246 711/103 |
| 2011/0191521 A1* | 8/2011 | Araki | G06F 12/0246 711/103 |
| 2012/0317345 A1* | 12/2012 | Pan | G06F 12/0246 711/103 |
| 2013/0145085 A1 | 6/2013 | Yu et al. | |
| 2014/0115239 A1* | 4/2014 | Kong | G06F 12/0246 711/103 |
| 2014/0181370 A1* | 6/2014 | Cohen | G06F 12/0246 711/103 |

FOREIGN PATENT DOCUMENTS

| CN | 102222046 A | 10/2011 |
|---|---|---|
| CN | 102473135 A | 5/2012 |
| TW | I386799 B1 | 2/2013 |

* cited by examiner

*Primary Examiner* — Ryan Bertram
*Assistant Examiner* — Trang Ta
(74) *Attorney, Agent, or Firm* — McClure, Qualey & Rodack, LLP

(57) ABSTRACT

A FLASH memory control technique with wear leveling between the different blocks of the FLASH memory. By a controller managing the blocks of a FLASH memory within a data storage device, some of the blocks are pushed into a spare queue waiting to be allocated as data blocks or system blocks. When the number of blocks within the spare queue is lower than a clean threshold and any block within the spare queue has an erase count greater than an overused lower threshold, the controller performs a garbage correction operation with wear leveling between the different blocks.

10 Claims, 2 Drawing Sheets

DATA STORAGE DEVICE AND FLASH MEMORY CONTROL METHOD

CROSS REFERENCE TO RELATED APPLICATIONS

This Application claims priority of Taiwan Patent Application No. 102131199, filed on Aug. 30, 2013, the entirety of which is incorporated by reference herein.

BACKGROUND OF THE INVENTION

Field of the Invention

The present invention relates to data storage devices, and in particular to FLASH memory control methods.

Description of the Related Art

Flash memory is a general non-volatile storage device that is electrically erased and programmed. A NAND Flash, for example, is primarily used in memory cards, USB flash devices, solid-state drives, and so on. In another application with a multi-chip package technique, a NAND FLASH chip and a controller chip are combined in one package as an embedded MultiMediaCard (eMMC).

Generally, the physical storage space of a FLASH memory (e.g. a NAND FLASH) comprises a plurality of blocks. To release a block as a spare block, the entire block has to be erased. However, a block is not always erasable. A block may be damaged if an erase operation is performed too many times. To prolong the lifetime of a FLASH memory, a wear leveling between the different blocks is an important issue in the FLASH memory, to narrow the gap between the erase counts of the different blocks.

BRIEF SUMMARY OF THE INVENTION

Data storage devices and FLASH memory control methods are disclosed.

A data storage device in accordance with an exemplary embodiment of the invention comprises a controller and a FLASH memory. The physical storage space provided by the FLASH memory comprises a plurality of blocks. The controller for the management of the plurality of blocks pushes some of the blocks into a spare queue, waiting to be allocated as system blocks or data blocks. When the number of blocks within the spare queue is lower than a clean threshold and any block within the spare queue has an erase count greater than an overused lower threshold, a garbage collection operation with wear leveling between the blocks is performed by the controller.

In another exemplary embodiment of the invention, a FLASH memory control method is disclosed, which comprises the following steps: managing a plurality of blocks of a FLASH memory to push some of the plurality of blocks into a spare queue waiting to be allocated as system blocks or data blocks; and performing a garbage collection operation with wear leveling between the blocks when the number of blocks within the spare queue is lower than a clean threshold and any block within the spare queue has a erase count greater than an overused lower threshold.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
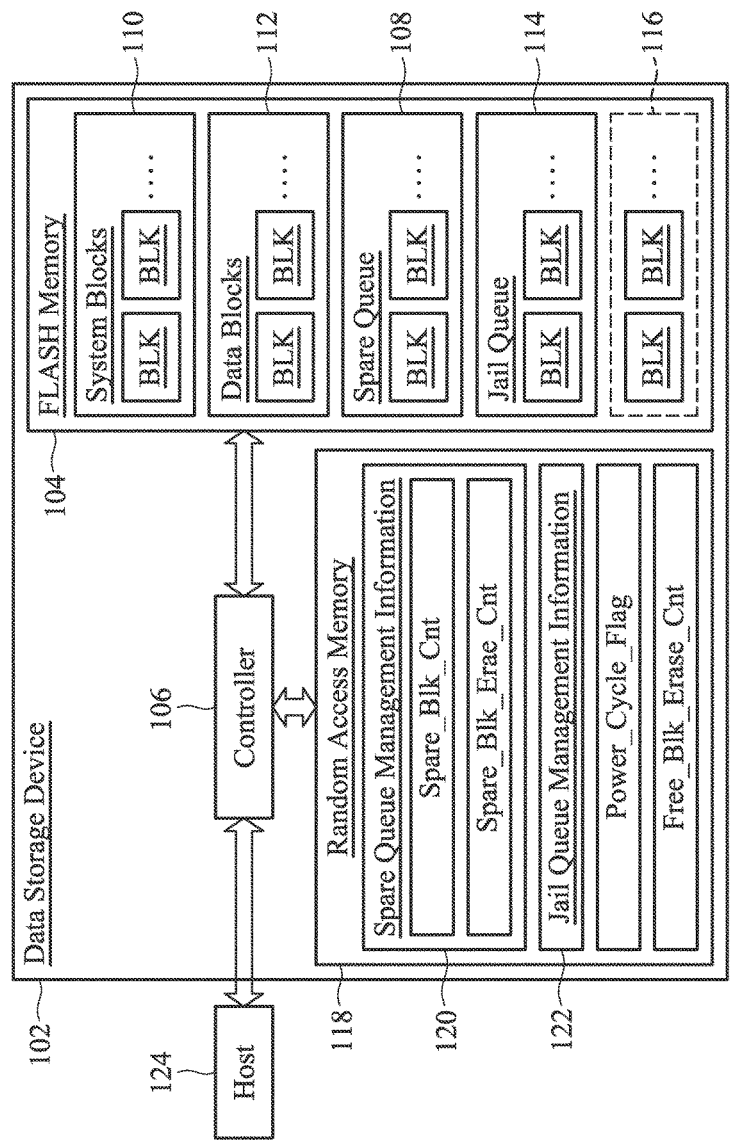
FIG. 1 is a block diagram depicting a data storage device in accordance with an exemplary embodiment of the invention.

FIG. 1 is a block diagram depicting a data storage device 102 in accordance with an exemplary embodiment of the invention. The data storage device 102 comprises a FLASH memory 104 and a controller 106. The FLASH memory 104 provides a physical storage space which includes a plurality of blocks BLKs. The controller 106 is provided for the management of the plurality of blocks BLKs. Under the control of the controller 106, some of the blocks BLKs are pushed into a spare queue 108 waiting to be allocated as systems blocks 110 for storage of system information or data blocks 112 for storage of user data. The controller 106 further pushes the blocks having erase counts higher than an overused higher threshold (OverUsed_H) to a jail queue 114 to freeze these blocks. The controller 106 specially monitors the number of blocks within the spare queue 108 and the erase counts of the blocks within the spare queue 108. When the number of blocks within the spare queue 108 is lower than a clean threshold (Clean_TH) and any block within the spare queue 108 has an erase count greater than an overused lower threshold (OverUsed_L), it means that there are not enough blocks within the spare queue 108 and some blocks within the spare queue 108 had been frequently rewritten with data. Thus, the controller 106 performs a garbage collection operation (cleaning the storage space) with wear leveling between the different blocks. In an exemplary embodiment, for wear leveling between the blocks, the controller 106 determines whether to clean the FLASH memory 104 (i.e., for space release, also known as a garbage collection operation) based on the number of blocks within the jail queue 114 (e.g., determining whether the number of blocks within the jail queue 114 is greater than a predetermined amount) and/or user performance (e.g. determining whether a routine of powering on and off is repeated) as well as the erase counts of the blocks.

In accordance with the disclosed techniques, the wear leveling between the blocks is achieved even when there are not enough blocks within the spare queue 108 and there is an urgent need to clean the storage space.

Under the conditions that the number of blocks within the spare queue 108 is lower than the clean threshold Clean_TH and any block within the spare queue 108 has an erase count greater than the overused lower threshold OverUsed_L, the controller, 106 in accordance with an exemplary embodiment of the invention, performs a garbage collection operation on the FLASH memory 104 with wear leveling between the different blocks when the jail queue 114 is full and/or the user operates the FLASH memory 104 in a power-cycling manner (by which a routine of powering on and off is repeated).

When the jail queue 114 is full, it means that the data stored in the other spaces rather than the jail queue 114 is cold data. Because the blocks stored with the cold data just contain a few invalid pages, there is less opportunity to release the space of these blocks having the lower erase counts (the blocks outside the jail queue 114). Furthermore, it is not unusual for a smartphone to operate a FLASH memory in a power-cycling manner. In a smartphone, the FLASH memory 104 may be written with a large amount of data and most of the blocks may be allocated as data blocks 112, leaving just a few blocks waiting for a new allocation. When the user of a smartphone randomly turns off the phone screen when visiting web sites and repeats this behavior at his pleasure, the limited spare blocks may be frequently rewritten for browsing websites and recording the power off/on system information, and so on (corresponding to the power-cycle routines). Thus, it may result in high erase counts in some blocks. In conclusion, the full status of the jail queue 114 and/or the repeating power on/off operation performed by the user is very unfavorable to the wear leveling between the different blocks of the FLASH memory 104. Fortunately, in accordance with the disclosure, the wear leveling between the different blocks is not ignored even if an urgent clean-space request happens (i.e., the number of blocks within the spare queue 108 is lower than the clean threshold Clean_TH). In response to the requests for space cleaning as well as wear leveling, the controller 106 takes erase counts into consideration when cleaning the space of the FLASH memory 104. Thus, a garbage collection operation is performed with wear leveling between the different blocks. The lifetime of the FLASH memory 104 is significantly extended.

In an exemplary embodiment, to clean the space of the FLASH memory 104 based on the erase counts, the controller 106 uses the block having the highest erase count between the blocks within the spare queue 108 as a valid data collection block. In this manner, an overused block is allocated for storage of cold data instead of being frequently rewritten with data. In other exemplary embodiments, the valid data collection block is implemented by the block having the second highest erase count between the blocks within the spare queue 108 instead of the block having the highest erase count between the blocks within the spare queue 108.

In an exemplary embodiment, to clean the space of the FLASH memory 104 based on the erase counts, the controller 106 performs a garbage collection operation particularly on the data block(s) having the lower erase count(s) (e.g., the block having the lowest erase count in the spare queue 108, or the blocks having the lowest and the second-lowest erase counts in the spare queue 108 or the block having the lowest or the second-lowest erase count in the spare queue 108) or also having the more invalid pages. In this manner, the blocks which have not been frequently rewritten with data are released to wait for an allocation.

In an exemplary embodiment, the controller 106 selects the block having the lowest erase count between the blocks within the spare queue 108 in response to a block allocation request for writing data (different from the valid data collection during a garbage collection operation). In this manner, the blocks which have not been frequently rewritten with data are allocated for write-data storage. In other exemplary embodiments, block(s) having the lower erase count(s) between the blocks within the spare queue 108 (e.g., the block having the lowest erase count in the spare queue 108, or the blocks having the lowest and the second-lowest erase counts in the spare queue 108 or the block having the lowest or the second-lowest erase count in the spare queue 108) may be allocated for write-data storage.

In an exemplary embodiment, after performing a garbage collection operation on the FLASH memory 104 based on erase counts, the controller 106 rearranges the spare queue 108 to contain the blank blocks having the lower erase counts between the free blocks 116 and the old spare queue 108. By the rearrangement of the spare queue 108, the blocks having low erase counts between the free blocks 116 gain the opportunity to be allocated for data storage (e.g. storage of user data or system information).

In another exemplary embodiment, when checking the jail queue 114 and the user behavior, the spare queue 108 is also checked to determine whether the number of blocks within the spare queue 108 is lower than the clean threshold Clean_TH by at least a predetermined amount but still greater than a threshold amount for discarding the FLASH memory 104. The erase counts are taken into account during the garbage collection operation only when the number of blocks within the spare queue 108 is lower than the clean threshold Clean_TH by at least the predetermined amount but still greater than the threshold amount for discarding the FLASH memory 104.

Referring to the exemplary embodiment of FIG. 1, the data storage device 102 further includes a random access memory 118, dynamically recorded with spare queue management information 120 (including Spare_Blk_Cnt and Spare_Blk_Erase_Cnt, where Spare_Blk_Cnt represents the number of blocks within the spare queue 108, and Spare_Blk_Erase_Cnt shows the erase counts of the different blocks within the spare queue 108 for recognition of hot blocks having erase counts greater than the overused lower threshold OverUsed_L), jail queue management information 122 (e.g., showing whether the jail queue 114 is full or not), a flag Power_Cycle_Flag indicating the power-cycle routine and erase counts Free_Blk_Erase_Cnt of free blocks 116. Based on the spare queue management information 120 (or even the jail queue management information 122 and the flag Power_Cycle_Flag) dynamically recorded in the random access memory 118, the controller 106 determines whether a garbage collection is performed on the FLASH memory 104 based on erase counts. Furthermore, the controller 106 may rearrange the spare queue 108 based on the erase counts Spare_Blk_Erase_Cnt of the blocks within the spare queue 108 and the erase counts Free_Blk_Erase_Cnt of free blocks 116. In this manner, the spare queue 108 is rearranged to contain blank blocks having lower erase counts.

Referring to FIG. 1, the data storage device 102 may be coupled to a host 124 and be controlled by the host 124. A data storage device of the disclosure may be implemented as a memory card, a USB flash device, a solid-state drive (SSD), and so on. In another application with a multi-chip package technique, a NAND FLASH chip and a controller chip are combined in one package as an embedded MultiMediaCard (eMMC). An eMMC may be equipped onto a portable electronic device, such as a smartphone, as a storage medium.

Figure 2:
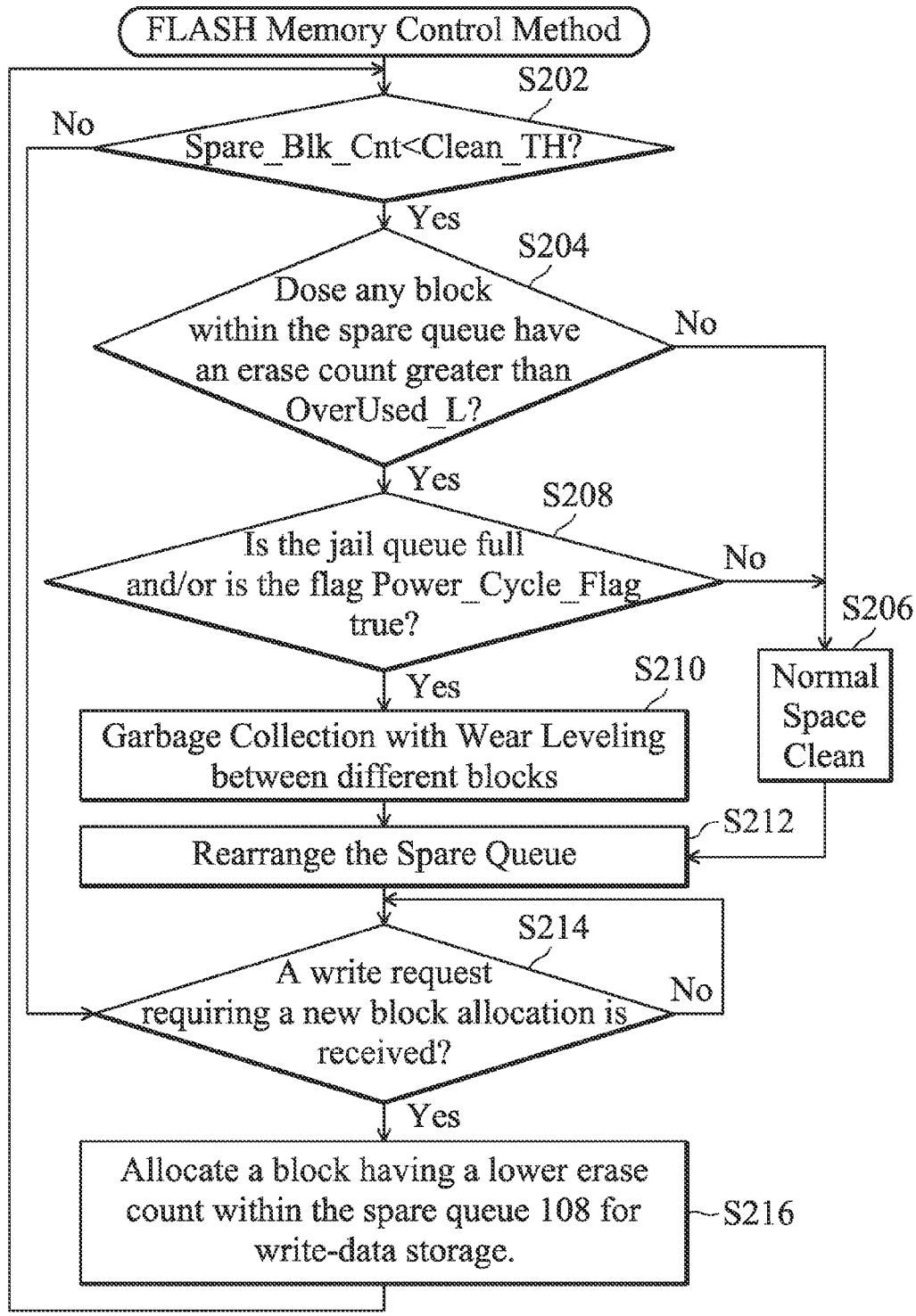
FIG. 2 is a flowchart depicting a FLASH memory control method in accordance with an exemplary embodiment of the invention.

FIG. 2 is a flowchart depicting a FLASH memory control method in accordance with an exemplary embodiment of the invention. The FLASH memory control method may be performed on the FLASH memory 104 by the controller 106 and is discussed with respect to the block diagram of FIG. 1.

In steps S202 and S204, the spare queue 108 is monitored. When the number within blocks Spare_Blk_Cnt within the spare queue 108 is lower than a clean threshold Clean_TH but no block within the spare queue 108 has an erase count higher than an overused lower threshold OverUsed_L, step S206 is performed for a normal space clean operation. The normal space clean operation is irrelevant to the erase counts of the different blocks, just using a spare block to collect the valid data within the blocks having considerable invalid pages and thereby releasing the space of blocks. When the number of blocks Spare_Blk_Cnt within the spare queue 108 is lower than the clean threshold Clean_TH and any block within the spare queue 108 has an erase count greater than the overused lower threshold OverUsed_L, the determination step S208 is performed to determine whether the jail queue 114 is full and/or whether the flag Power_Cycle_Flag is true. In another exemplary embodiment, it is further determined in step S208 whether the number of blocks Spare_Blk_Cnt within the spare queue 108 is lower than the clean threshold Clean_TH by at least a predetermined amount but still greater than a threshold amount for discarding the FLASH memory. When it shows true in step S208, step S210 is performed to clean the space of the FLASH memory based on the erase counts for wear leveling between the different blocks of the FLASH memory 104.

Step S212 is performed after step S210, to rearrange the spare queue 108 and thereby the spare queue 108 contains blank blocks having the lower erase counts. In step S214, it is monitored whether a write request requiring a new allocation of a block is received (different from the block allocation for valid data collection during a garbage collection operation). When a new block allocation is called for, step S216 is performed and the block having the lower erase count (or even the lowest) within the spare queue 108 is allocated for storage of write data. After the block allocation of step S216, steps S202 and S204 are repeated to continue the monitoring of the spare queue 108. Step S212 is further performed after the normal space clean operation S206. Note that step S212 is optional and may be omitted in some exemplary embodiments.

In some exemplary embodiments, the controller 106 may include a computing unit and a read-only memory (ROM). The technical steps of the disclosure may be implemented by firmware with program coding. The related program codes are loaded in the read-only memory to be executed by the computing unit. Any control technique for a FLASH memory involving the technical concepts of the disclosure is also in the scope of the invention. FLASH memory control methods are also introduced in the disclosure and may be performed by any controller architecture.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
    a FLASH memory; and
    a controller, for management of a spare queue for the FLASH memory, blocks within the spare queue are entirely-erased,
    wherein:
    the controller further manages a jail queue to freeze blocks whose erase counts are greater than an overused higher threshold;
    the controller performs a garbage collection operation with wear leveling when the blocks within the spare queue are less than a clean threshold, any block within the spare queue has an erase count greater than an overused lower threshold, and both of the following two specific conditions are; wherein:
    one of the two specific conditions shows that the blocks frozen within the jail queue are more than a predetermined amount and another of the two specific condition shows that the FLASH memory is in a power-cycle routine; and
    when performing the garbage collection operation with wear leveling, the controller selects one block from higher erase count blocks in the spare queue to collect valid data.

2. The data storage device as claimed in claim 1, wherein:
    when performing the garbage collection operation with wear leveling, the controller cleans a data block having a lower erase count.

3. The data storage device as claimed in claim 1, wherein:
    when performing the garbage collection operation with wear leveling, the controller cleans a data block having a lower erase count and having more invalid pages.

4. The data storage device as claimed in claim 1, wherein:
    after the garbage collection operation with wear leveling is performed, the controller selects one block having the lowest erase count in the spare queue for write-data storage.

5. The data storage device as claimed in claim 1, wherein:
    after the garbage collection operation with wear leveling is performed, the controller selects none block having a lower erase count in the spare queue for write-data storage.

6. A FLASH memory control method, comprising:
    managing a spare queue in for a FLASH memory, wherein blocks within the spare queue are entirely-erased;
    managing a jail queue for the FLASH memory to freeze blocks whose erase counts are greater than an overused higher threshold;
    performing a garbage collection operation with wear leveling when the blocks within the spare queue are less than a clean threshold, any block within the spare queue has an erase count greater than an overused lower threshold, and both of the following two specific conditions are true, wherein:
    one of the two specific conditions shows that the blocks frozen within the jail queue are more than a predetermined amount and another of the two specific condition shows that the FLASH memory is in a power-cycle routine; and
    when performing the garbage collection operation with wear leveling, valid data is collected by one block selected from higher erase count blocks in the spare queue.

7. The FLASH memory control method as claimed in claim 6, wherein:
    during the garbage collection operation with wear leveling, a data block having a lower erase count is cleaned.

8. The FLASH memory control method as claimed in claim 6, wherein:
    during the garbage collection operation with wear leveling, a data block having a lower erase count and more invalid pages is cleaned.

9. The FLASH memory control method as claimed in claim 6, wherein:
    after the garbage collection operation with wear leveling is performed, one block having the lowest erase count in the spare queue is selected for write-data storage.

10. The FLASH memory control method as claimed in claim 6, wherein:

after the garbage collection operation with wear leveling is performed, one block having a lower erase count in the spare queue is selected for write-data storage.

* * * * *